United States Patent
Lee et al.

(10) Patent No.: US 9,433,013 B2
(45) Date of Patent: Aug. 30, 2016

(54) CENTRALIZED-SCHEDULING METHOD AND APPARATUS FOR INTER-CELL INTERFERENCE COORDINATION IN HETEROGENEOUS NETWORK

(71) Applicant: Samsung Electronics Co., Ltd., Gyeonggi-do (KR)

(72) Inventors: Heekwang Lee, Gyeonggi-do (KR); Hojoong Kwon, Gyeonggi-do (KR); Chungryul Chang, Gyeonggi-do (KR); June Moon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 229 days.

(21) Appl. No.: 13/760,581

(22) Filed: Feb. 6, 2013

(65) Prior Publication Data
US 2013/0225193 A1 Aug. 29, 2013

(30) Foreign Application Priority Data

Feb. 6, 2012 (KR) ......................... 10-2012-0011970

(51) Int. Cl.
*H04W 72/12* (2009.01)
*H04L 1/00* (2006.01)
*H04W 36/00* (2009.01)

(52) U.S. Cl.
CPC ........ *H04W 72/1231* (2013.01); *H04L 1/0015* (2013.01); *H04L 1/0026* (2013.01); *H04L 1/0077* (2013.01); *H04W 36/0083* (2013.01)

(58) Field of Classification Search
CPC . H04W 28/048; H04W 16/14; H04W 72/04; H04W 92/20; H04W 72/12; H04W 72/0426; H04W 72/082; H04W 24/02; H04W 36/18; H04W 52/343; H04W 48/20; H04W 52/244; H04W 72/0433; H04W 78/087; H04W 76/048; H04W 84/045; H04L 5/006; H04L 1/0026; H04J 11/005; H04J 11/0023; H04B 17/318; H04B 17/34
USPC ........ 370/329, 280, 252, 229, 328; 455/501, 455/509, 522, 452.2
See application file for complete search history.

(56) References Cited

U.S. PATENT DOCUMENTS

| | | | |
|---|---|---|---|
| 2010/0216450 A1* | 8/2010 | Fujishima et al. | 455/422.1 |
| 2010/0233962 A1* | 9/2010 | Johansson et al. | 455/63.1 |
| 2010/0261482 A1* | 10/2010 | Guey | 455/452.2 |
| 2011/0149877 A1* | 6/2011 | Hafeez | 370/329 |

(Continued)

OTHER PUBLICATIONS

Intercell Interference Management in an OFDM based downlink—Institutionen for systemteknik Department of EE Jessica Heyman.*

(Continued)

*Primary Examiner* — Nizar Sivji
(74) *Attorney, Agent, or Firm* — The Farrell Law Firm, P.C.

(57) ABSTRACT

A centralized scheduling method and apparatus is provided for minimizing inter-cell interference in the wireless communication system adopting femto-eNB-based service coverage expansion (range expansion). The method includes establishing, by a server, a connection with at least one base station, collecting channel information between the at least one base station connected to the server and terminals, determining interfering base stations causing interference to each terminal based on the channel information, and selecting the terminals to be scheduled in consideration of the interfering base stations.

19 Claims, 13 Drawing Sheets

(56) References Cited

U.S. PATENT DOCUMENTS

2011/0217983 A1* 9/2011 Morimoto et al. ............ 455/450
2011/0310758 A1* 12/2011 Tamaki et al. ................ 370/252
2012/0093093 A1* 4/2012 Frenger et al. ............... 370/329
2012/0208547 A1* 8/2012 Geirhofer et al. ......... 455/452.2

OTHER PUBLICATIONS

LTE-Advanced and 4G Wireless Communications: Coordinated Multipoint Transmission and Reception in LTE-Advanced: Deployment Scenarios and Operational Challenges.*

* cited by examiner

| UE | PF metric | Serving Cell | INTERFERENCE Cell Set |
|---|---|---|---|
| B | 70 | #2 | 3, 6 |
| C | 60 | #3 | 1 |
| A | 50 | #1 | 3, 5, 9 |
| D | 40 | #4 | - |
| F | 30 | #6 | 5 |
| G | 20 | #7 | 6, 8 |
| E | 10 | #5 | - |

CENTRALIZED-SCHEDULING METHOD AND APPARATUS FOR INTER-CELL INTERFERENCE COORDINATION IN HETEROGENEOUS NETWORK

PRIORITY

This application claims priority under 35 U.S.C. §119(a) to Korean Patent Application Serial No. 10-2012-0011970, which was filed on Feb. 6, 2012 in the Korean Intellectual Property Office, the contents of which are incorporated herein by reference.

BACKGROUND OF THE INVENTION

1. Field of the Invention

The present invention relates generally to a centralized scheduling method and apparatus for minimizing inter-cell interference in a heterogeneous network including a macro Base Station (BS) and lower power Local evolved Node Bs (LeNBs), and more particularly, to a centralized scheduling method and apparatus for minimizing inter-cell interference in the wireless communication system adopting femto-eNB-based service coverage expansion (range expansion).

2. Description of the Related Art

In order to increase the coverage and capacity of a macro BS-only network, extensive research has been conducted to deploy LeNBs, particularly in association with the 3$^{rd}$ Generation Partnership Project Long Term Evolution-Advanced (3GPP LTE-A). For example, the coverage expansion can be achieved with a Heterogeneous Network (HetNet) implemented by deploying Remote Radio Heads (RRHs), pico or femto cells, or relays within the coverage of a macro cellular network.

A HetNet is capable of achieving a more gainful spatial reuse effect through cell splitting. However, the significant difference in transmission power between the macro and micro eNBs increases inter-cell interference.

Recently, a method for expanding the coverage of the micro eNB by offloading the macro eNB to the micro eNB has been disclosed to improve the capacity and fairness of the HetNet.

One approach for coverage expansion of the micro eNB is to increase the Transmission (Tx) power of the micro eNB and have each terminal attach to the eNB transmitting the single with the strongest Downlink (DL) Received Signal Strength (RSS) in the cell selection procedure. In the case, however, both the macro and LeNB terminals are likely to experience significant interference.

Another approach for coverage expansion of the micro eNB is to give the DL RSS of the micro eNB a positive offset (range expansion bias). In this case, the terminal selects the micro eNB to which it is nearer than the macro eNB, although the DL RSS of the macro eNB is stronger than that of the micro eNB. Accordingly, it is possible to expand the coverage of the micro eNB without increasing its transmission power.

However, the terminal attached to the micro eNB within its expanded area is likely to be influenced by significant inter-cell interference from the macro eNB having the stronger DL RSS than that of the micro eNB.

The coverage expansion of the micro eNB is capable of improving the capacity of the macro eNB by offloading the macro User Equipment (UEs) to the micro eNB. However, the low link performance of the UE located in the range expansion area of the micro eNB causes degradation of the sum capacity of the network.

To this end, there has been disclosed a multi-cell cooperative transmission technology to improve cell edge performance by mitigating the inter-cell interference, otherwise known as Coordinated Multi-Point transmission and reception technology (CoMP) under discussion in the 3GPP LTE Rel. 11 standard. The aforementioned problems, however, also may occur in the CoMP scenarios 3 and 4, i.e. CoMP scenarios in the HetNet environment.

In CoMP scenario 3, the multiple TPs (Transmission Points or low power RRHs) participating in coordination within the macro cell coverage have a different PCID from that of the macro cell. In CoMP scenario 4, the multiple TPs participating in coordination within the macro cell coverage have the same PCID as the macro cell.

Figure 1A:
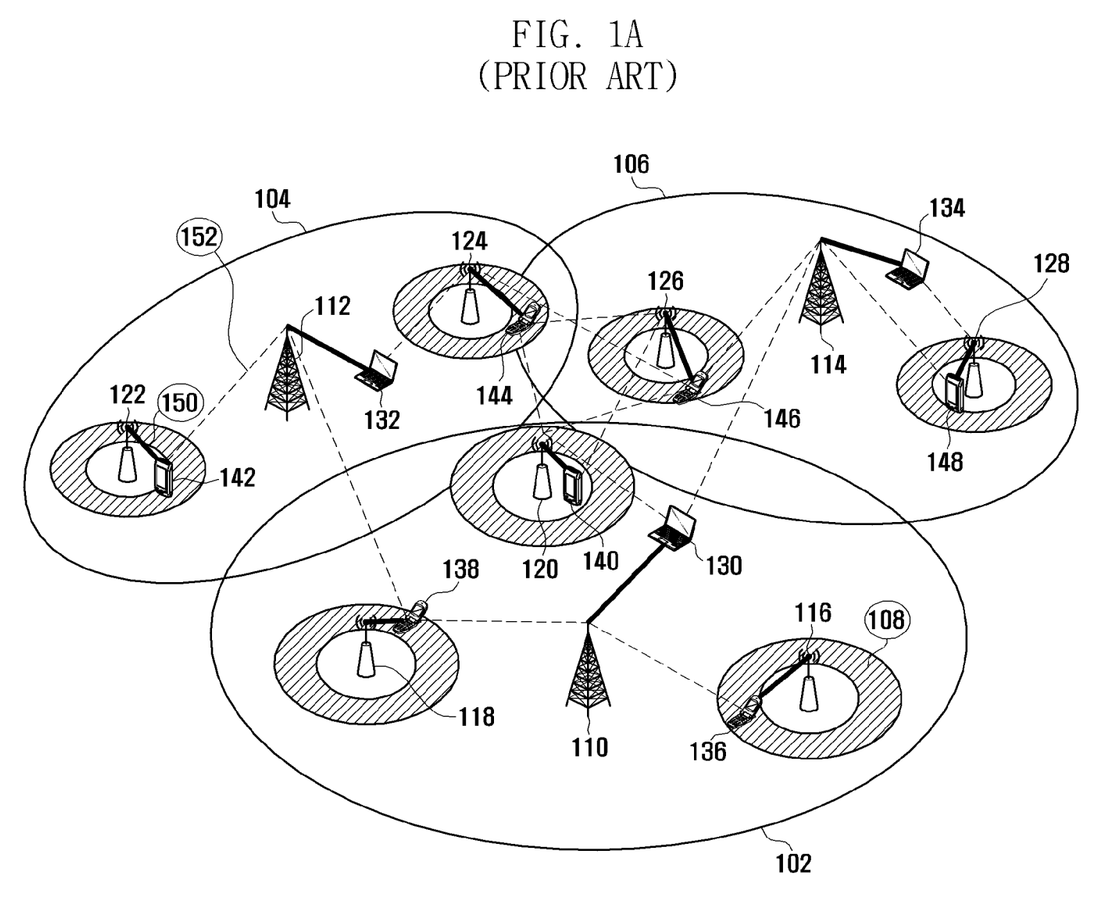
FIG. 1A illustrates a conventional HetNet which causes significant inter-cell interference.

FIG. 1A illustrates a conventional HetNet which causes significant inter-cell interference. As shown in FIG. 1A, the conventional HetNet includes macro eNBs 110, 112, and 114, micro eNBs 116, 118, 120, 122, 124, 126, and 128, and UEs 130, 132, 134, 136, 138, 140, 142, 144, 146, and 148. Reference numerals 102, 104, and 106 denote the coverage of macro eNBs 110, 112, and 114, respectively.

In the HetNet of FIG. 1A, the coverage of each of the micro eNBs 116, 118, 120, 122, 124, 126, and 128 has been expanded. Reference numeral 108 denotes the range expansion area of the micro eNB.

Reference numeral 150 denotes a desired signal between the UE and the eNB. In FIG. 1A, the UEs 130 to 134 are scheduled by the macro eNBs, while the UEs 136 to 148 are scheduled by the micro eNBs.

In FIG. 1A, reference numeral 152 denotes inter-cell interference. As shown in FIG. 1A, it is noted that all of the UEs are experiencing significant inter-cell interferences in the conventional HetNet.

Figure 1B:
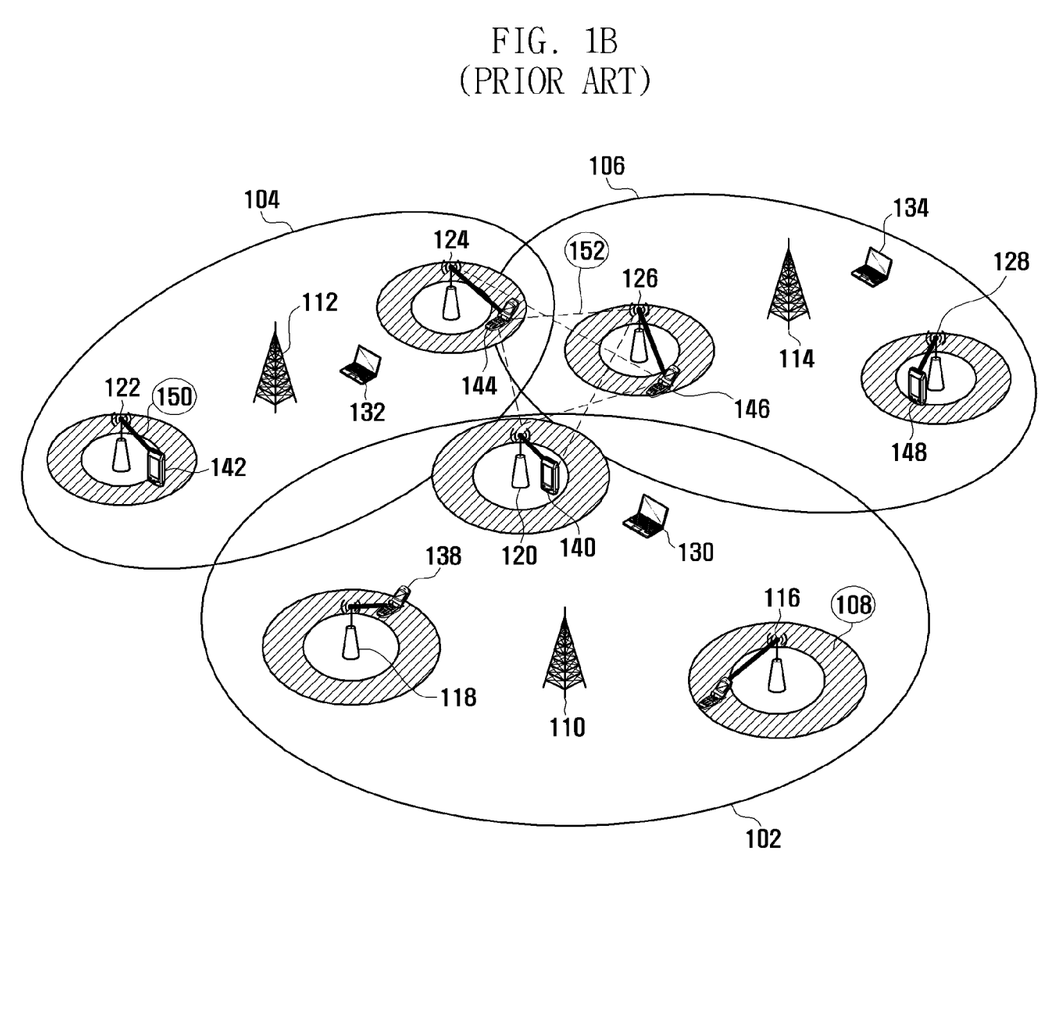
FIG. 1B illustrates the conventional HetNet with blanked macro eNBs.

FIG. 1B illustrates the conventional HetNet with blanked macro eNBs. Compared to FIG. 1A, some of the inter-cell interferences in FIG. 1B are removed by blanking the macro eNBs.

The macro eNBs are blocked in the HetNet of FIG. 1B as compared to FIG. 1A, which indicates that the macro eNBs have stopped data transmission. Accordingly, the inter-cell interferences from the micro eNBs and neighbor macro eNBs to the macro UEs 130, 132, and 134 have been canceled.

Accordingly, there is a need in the art of enhanced cell association and Inter-Cell Interference Coordination (ICIC) technologies for efficient operation of the HetNet.

SUMMARY OF THE INVENTION

The present invention has been made in an effort to solve the above-mentioned problems, and it is an object of the present invention to provide a centralized-scheduling method and apparatus that is capable of minimizing the inter-cell interference and thus maximizing the throughput in a HetNet adopting the micro eNB coverage expansion technique.

In accordance with an aspect of the present invention, an inter-cell interference control method of a server in a heterogeneous network includes establishing a connection with at least one base station, collecting channel information between the at least one base station connected to the server and terminals, determining interfering base stations causing interference to each terminal based on the channel information, and selecting the terminals to be scheduled in consideration of the interfering base stations.

In accordance with another aspect of the present invention, an inter-cell interference canceling apparatus of a heterogeneous network includes a communication unit which establishes a connection with at least one base station, and a control unit which controls collecting channel information between the at least one base station connected to the server and terminals, determining interfering base stations causing interference to each terminal based on the channel information, and selecting the terminals to be scheduled in consideration of the interfering base stations.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, a detailed description of known functions and configurations incorporated herein will be omitted for the sake of clarity and conciseness.

The same reference numerals are used throughout the drawings to refer to the same or like parts. In the drawings, certain elements may be exaggerated or omitted or schematically depicted for clarity of the invention, and the actual sizes of the elements are not reflected.

Figure 2A:
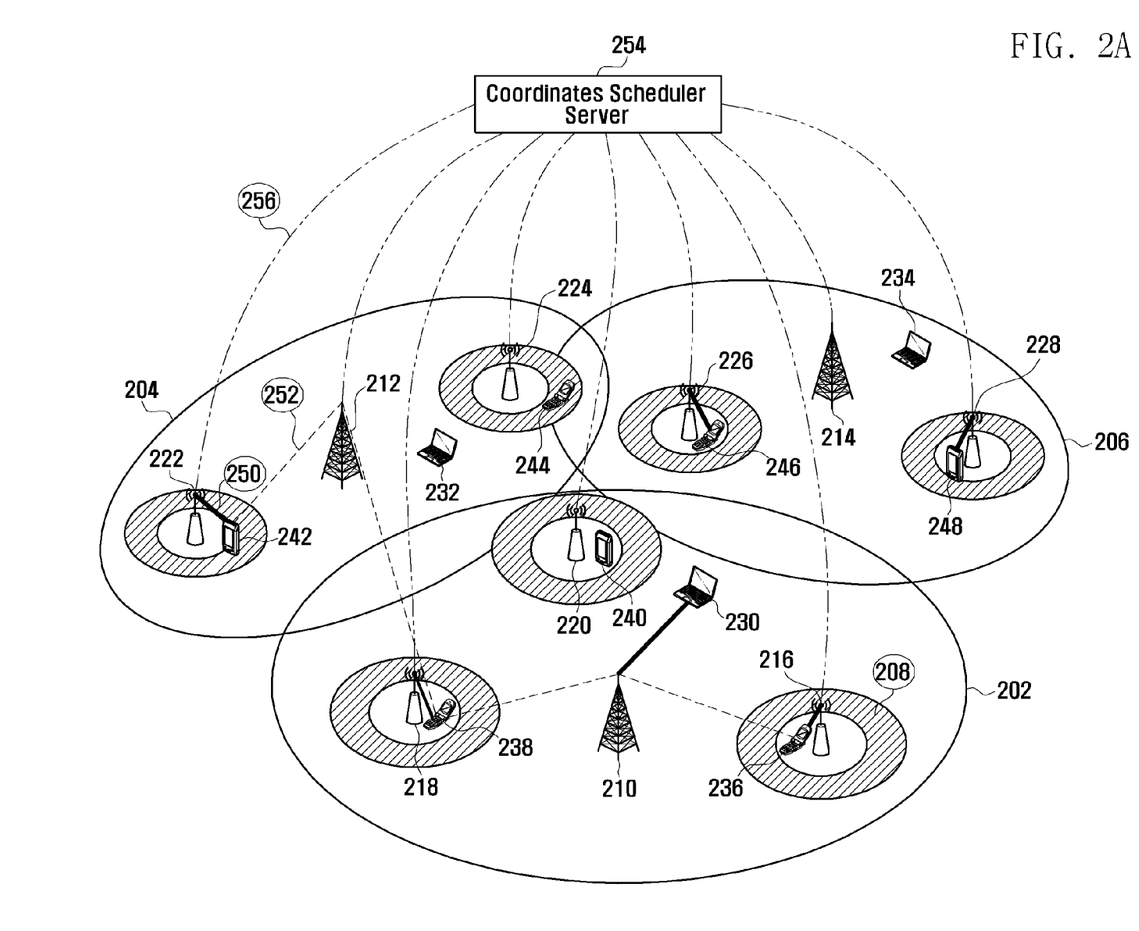
FIG. 2A illustrates a HetNet operating with the centralized scheduling algorithm at a normal subframe according to an embodiment of the present invention.

FIG. 2A illustrates a HetNet operating with the centralized scheduling algorithm at a normal subframe according to an embodiment of the present invention.

As shown in FIG. 2A, the HetNet includes macro eNBs 210, 212, and 214, micro eNBs 216, 218, 220, 222, 224, 226, and 228, and UEs 230, 232, 234, 236, 238, 240, 242, 244, and 248. Unlike the HetNets of FIGS. 1A and 1B, the HetNet of FIG. 2A further includes a centralized scheduler server 254. Reference numeral 256 denotes optic backhaul or Ethernet backhauls connecting the centralized scheduler server 254 and the macro and micro eNBs. The eNBs exchange channel information through an X2 interface.

The HetNet of FIG. 2A includes the micro eNBs 216 to 228 having the coverage or range expansion areas. Reference numeral 208 denotes the range expansion area of each micro eNB. The UEs 230 to 234 are scheduled by the macro eNBs while the UEs 236 to 248 are scheduled by micro eNBs.

In FIG. 2A, reference numeral 252 denotes inter-cell interference. Unlike FIG. 1A, the inter-cell interferences from neighbor macro eNBs to a macro UE, the inter-cell interferences from the micro UEs to the macro eNBs, and the inter-cell interferences from neighbor micro eNBs to a micro UE are efficiently canceled in the HetNet of FIG. 2A.

Figure 2B:
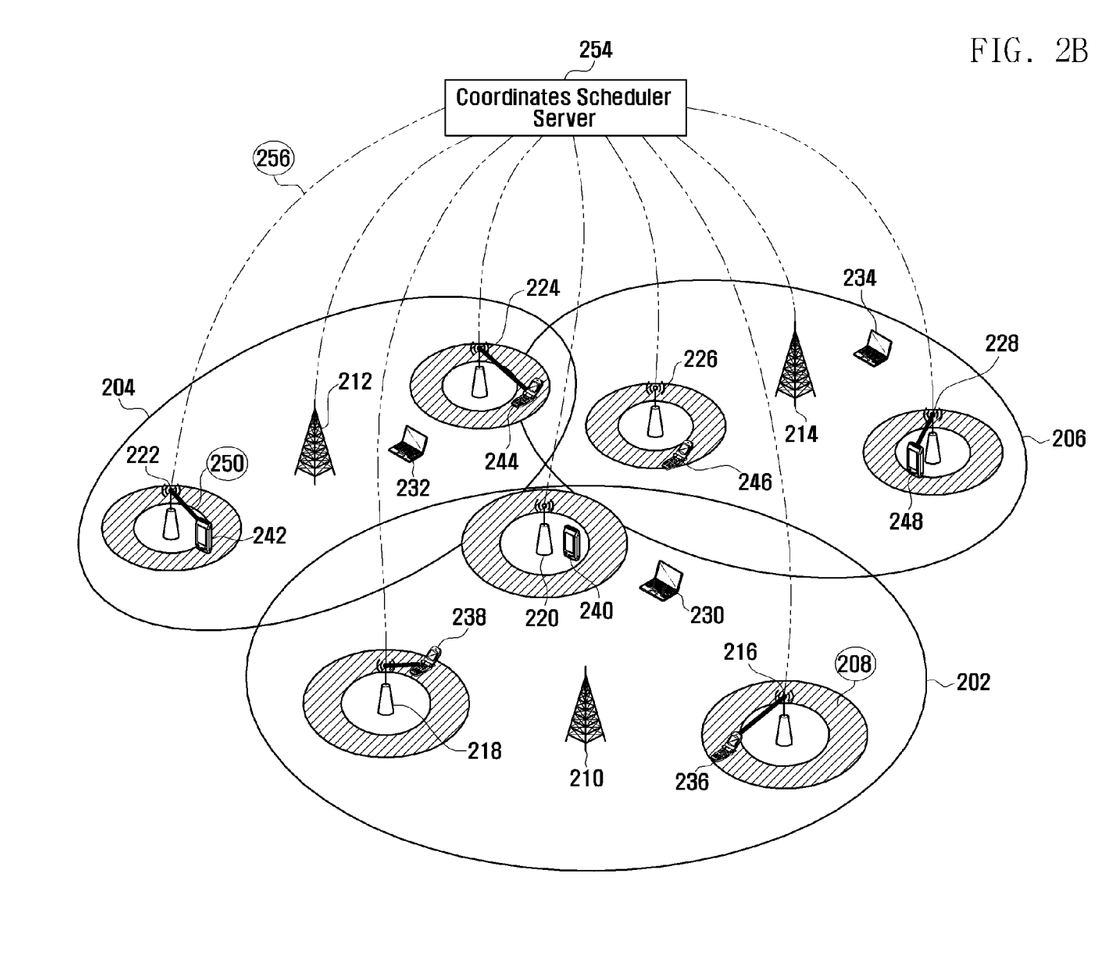
FIG. 2B illustrates a HetNet operating with the centralized scheduling algorithm at a macro blank subframe according to an embodiment of the present invention.

FIG. 2B illustrates a HetNet operating with the centralized scheduling algorithm at a macro blank subframe according to an embodiment of the present invention.

Unlike FIG. 2A, the macro eNBs are blocked at the macro blank subframe in the HetNet of FIG. 2B. As compared to FIG. 1B, the inter-cell interferences from neighbor micro eNBs to the micro UEs as well as the inter-cell interferences from neighbor macro eNBs to the macro UEs, from the macro eNBs to the micro UEs, and from the macro UEs to the micro UEs have been efficiently canceled in the HetNet of FIG. 2B.

Figure 3A:
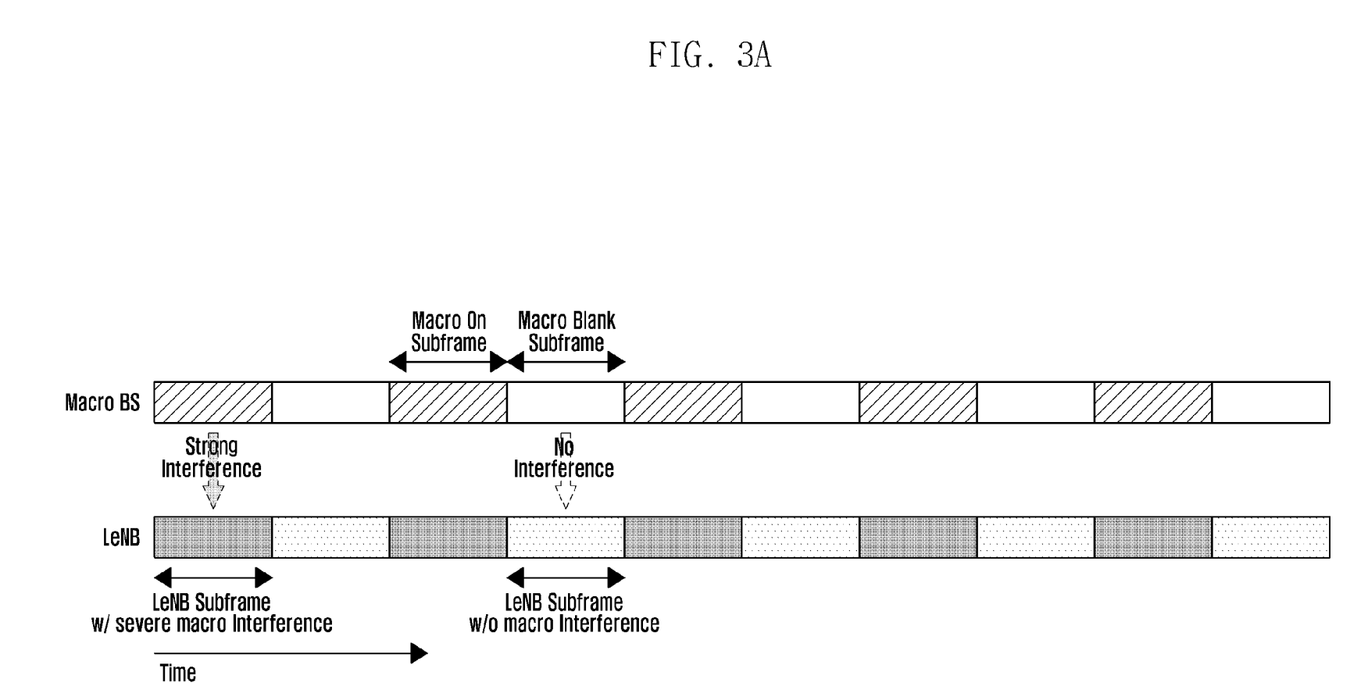
FIG. 3A illustrates a macro blank subframe pattern in which the rate of macro blank frame to macro on frame is ½ (50%) according to an embodiment of the present invention.
Figure 3B:
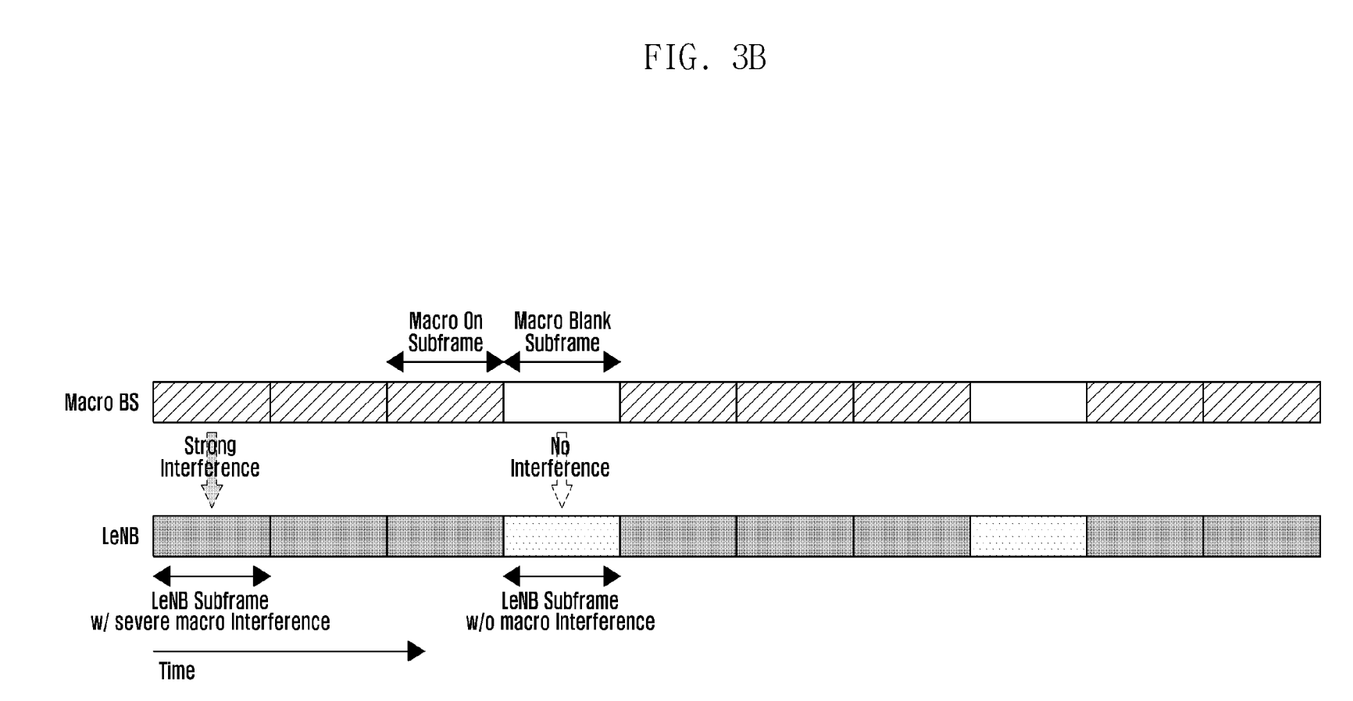
FIG. 3B illustrates a macro blank subframe pattern in which the rate of macro blank frame to macro on frame is ¼ (25%) according to an embodiment of the present invention.

FIGS. 3A and 3B illustrate patterns of macro blank subframes for use in the HetNet according to an embodiment of the present invention.

FIG. 3A shows a macro blank subframe pattern in which the rate of macro blank frame to macro on frame is ½ (50%). As shown in FIG. 3A, when the macro eNBs (or Macro BSs) are on, inter-cell interference occurs from the macro eNBs to the micro eNBs.

FIG. 3B shows a macro blank subframe pattern in which the rate of macro blank frame to macro on frame is ¼ (25%). Compared to that of FIG. 3A, the macro blank subframe pattern of FIG. 3B increases the probability of inter-cell interference from the macro eNBs to the micro eNB.

Figure 4:
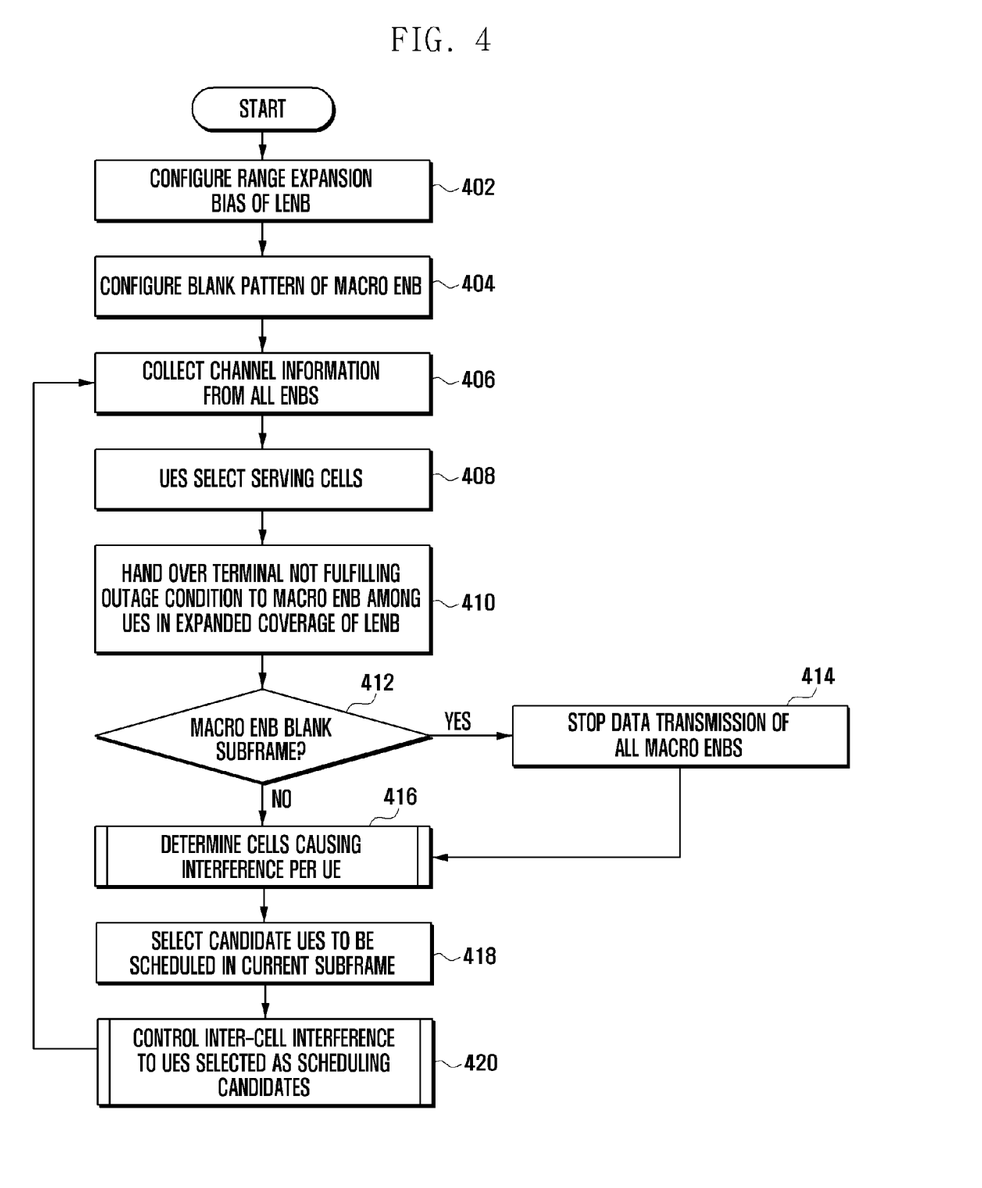
FIG. 4 illustrates the inter-cell interference control procedure of the inter-cell interference cancellation apparatus according to an embodiment of the present invention.

FIG. 4 illustrates the inter-cell interference control procedure of the inter-cell interference cancellation apparatus, i.e. centralized scheduler server 254, according to an embodiment of the present invention.

The server 254 and the macro and micro eNBs are connected through the optic backhaul or Ethernet backhaul. The centralized scheduling can be implemented with the coordinated cells including the micro eNBs with the exception of the macro eNBs. In this case, the optic backhaul or Ethernet backhauls are established only between the server 254 and the micro eNBs.

Referring to FIG. 4, the centralized scheduler server 254 configures the range expansion bias to the micro eNB at step 402. The centralized scheduler server 254 determines the range expansion bias in consideration of the macro eNB coverage, number of deployed micro eNBs, and transmission powers of the macro and micro eNBs.

The centralized scheduler server 254 controls the range expansion of the micro eNB in such a manner to assign positive offset (range expansion bias) to the DL RSS of the micro eNB.

In this manner, the centralized scheduler server 254 is capable of connecting the UE located near a micro eNB to the micro eNB, rather than to the macro eNB having the higher transmit power than that of the micro eNB without increasing the transmission power of the micro eNB. This expands the service coverage of the micro eNB.

The centralized scheduler server 254 determines the blank pattern of each macro eNB at step 404. That is, the centralized scheduler server 254 determines the transmission power-off period of the macro eNB.

For example, the centralized scheduler server 254 may set the blank pattern of the macro eNB to the rate of macro blank subframe to normal subframe, such as ½, ¼, or ⅛. If the appearance frequency of the macro blank subframe to the normal subframe is set to a high value, the scheduling probability of the macro UE decreases. If the appearance frequency of the macro blank subframe to the normal subframe is set to a low value, the probability of the inter-cell interference from the macro eNB increases.

Accordingly, the centralized scheduler server 254 determines the blank pattern in consideration of the range expansion bias of the micro eNB, which has been set at step 402. According to the operation mechanism of the centralized scheduler server 254, it is possible to transmit data at a low power level rather than turning off the transmission power of the macro eNB at the macro blank subframe.

The centralized scheduler server 254 collects channel information between the eNBs and UEs that are collected and measured by the macro and micro eNBs within the coordinated cluster to share in common with the macro and micro eNBs at step 406.

The channel information fed back by the UE to the macro and micro eNBs and shared with the centralized scheduler 254 may include a Channel Quality Indicator (CQI) and a Rank Indicator (RI).

Figure 8A:
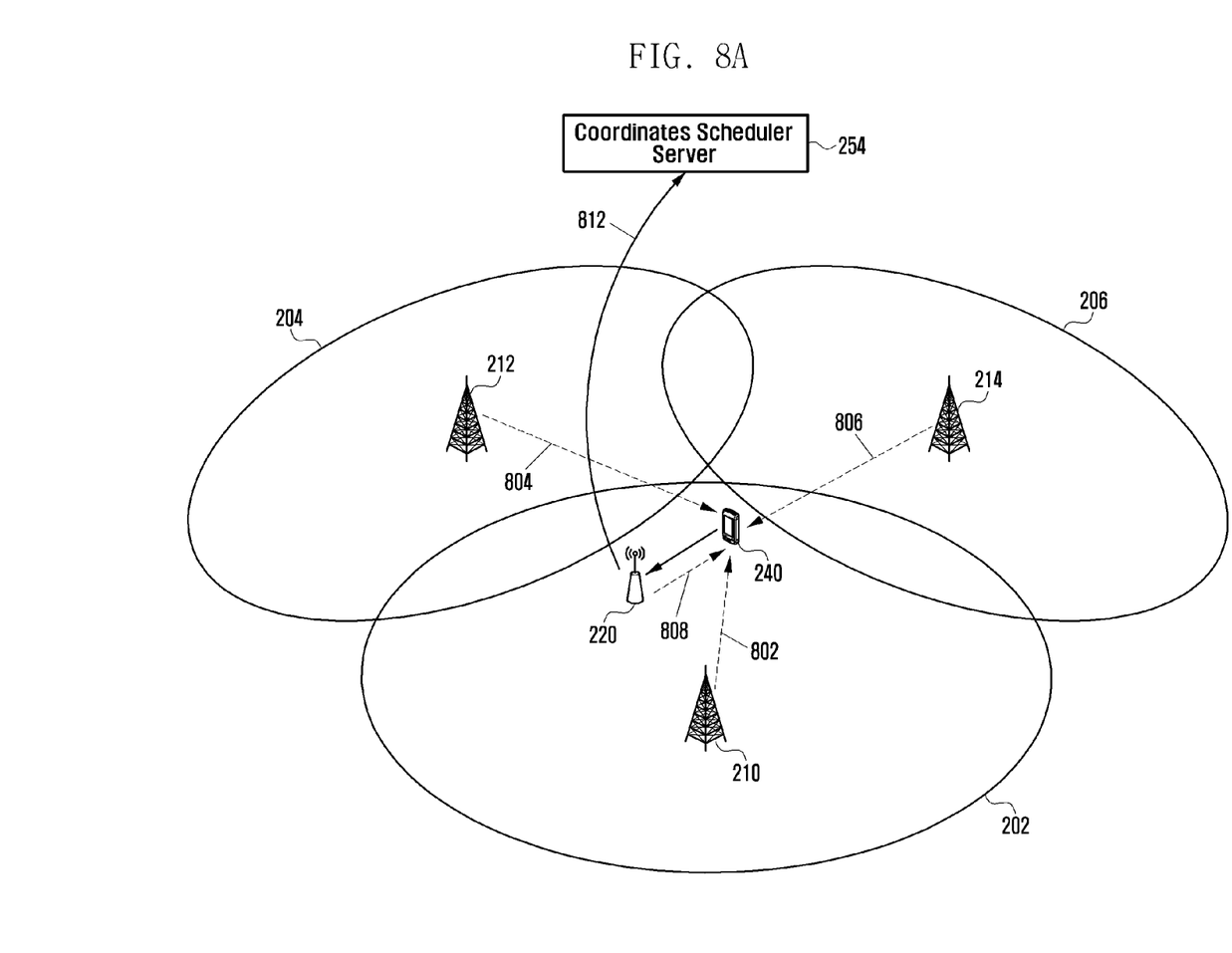
FIG. 8A illustrates an example of sharing the feedback channel information with the centralized scheduler 254.

FIG. 8A illustrates an example of sharing the feedback channel information with the centralized scheduler 254. Referring to FIG. 8A, the UE 240 measures channel information for neighbor macro eNBs 210 to 214 as denoted by reference numerals 802 to 808 and micro eNB 220 and feeds back the channel information to the serving eNB 220 as denoted by reference numeral 810, and the serving eNB 220 delivers the information fed back by the UE 240 to the centralized scheduler 254 as denoted by reference numeral 810.

Figure 8B:
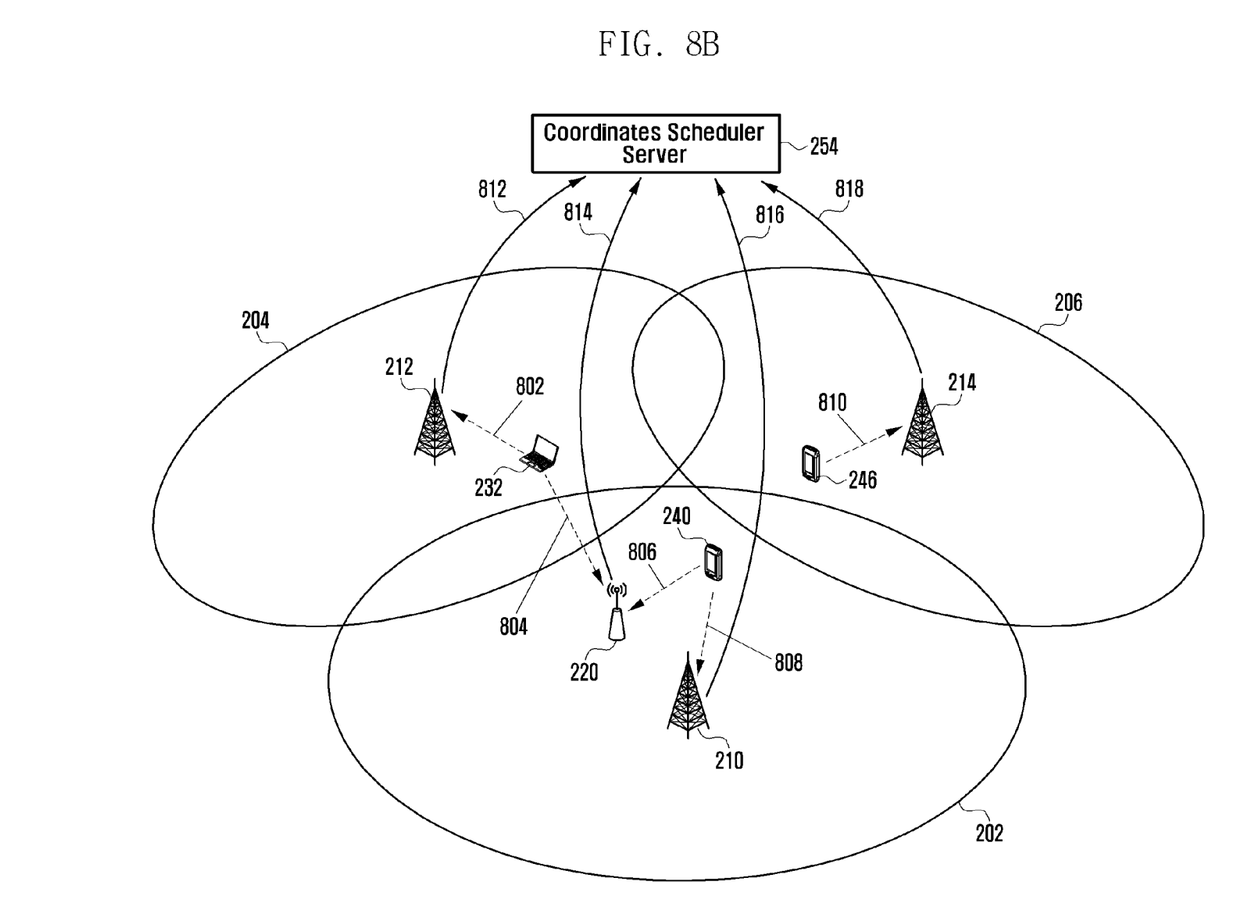
FIG. 8B illustrates an example of sharing the channel information related to the macro and micro eNBs with the centralized scheduler 254.

The channel information of the macro and micro eNBs that is shared with the centralized scheduler 254 may include RSRP and UpLink (UL) Sounding Reference Signal (SRS) power based on Cell Specific Reference Signal (CRS) or Channel State Information Reference Signal (CSI-RS).

FIG. 8B illustrates an example of sharing the channel information related to the macro and micro eNBs with the centralized scheduler 254. Referring to FIG. 8B, the macro eNBs 210 to 214 and the micro eNB 220 receive the channel information measured by the UEs 232, 240, and 246 as denoted by reference numerals 802 to 810 and send the received information with the centralized scheduler 254 as denoted by reference numerals 812 to 818.

Returning to FIG. 4, all UEs select respective serving cells (serving eNB) at step 408, by applying the range expansion bias of the preset micro eNB which has been set at step 402. The micro UE fulfilling the following condition expressed below in Equation (1) with the range expansion bias is located in the expanded area of the micro eNB.

$$(RSS_{i,\ LeNB})_{dB} < (RSS_{i,\ Macro})_{dB},\ S = \{i | (RSS_{i,\ LeNB})_{dB} < (RSS_{i,\ Macro})_{dB},\ (RSS_{i,\ LeNB})_{dB} + \text{Offset}_{RE\_Bias} < (RSS_{i,\ Macro})_{dB} \} \quad (1)$$

The centralized scheduler server 254 performs a handover of the UE which does not fulfill the outage condition among the UEs determined as range expansion LeNB UEs with the range expansion bias to a macro eNB at step 410. The handover determination is performed with following formula.

$$(SINR_{i,\ LeNB})_{dB} \text{ in Macroblank subframe} < \text{Outage\_Threshold} \quad (2)$$

The centralized scheduler server 254 determines whether the corresponding subframe is the macro blank subframe, at step 412, by applying the macro blank pattern that has been configured at step 404.

If the macro blank subframe is determined, the centralized scheduler server 254 stops data transmission to the UEs served by all macro eNBs connected to the centralized scheduler server 254 at the corresponding subframe at step 414. In this manner, the centralized scheduler server 254 is capable of canceling the inter-cell interference from the high transmission power macro eNBs to the micro eNBs (LeNBs) at the macro blank subframes.

If the macro blank subframe is not determined, the centralized scheduler server 254 determines an interference cell set of the cells generating interference to each UE at step 416. The interference cell set may include both the macro and micro eNBs (cells). If the corresponding subframe is a macro blank subframe, all macro eNBs are blanked and thus the macro eNB cells are excluded from the interference cell set.

Figure 5:
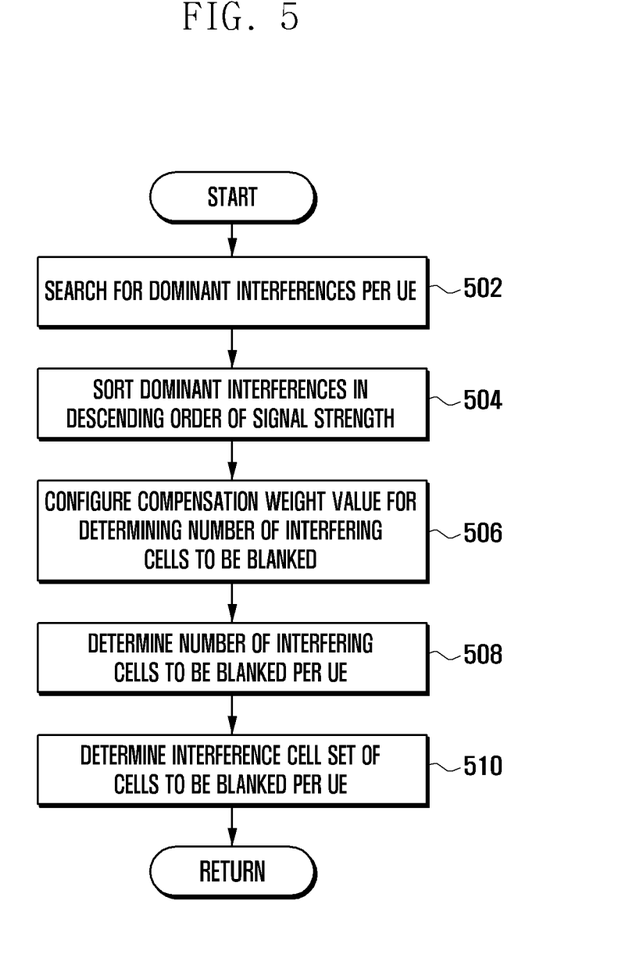
FIG. 5 illustrates the details of the interference cell set determination step of FIG. 4.

FIG. 5 illustrates the details of the interference cell set determination step 416 of FIG. 4.

The centralized scheduler server 254 searches for a dominant interference to each UE at step 502. There may be more than one dominant interference source per UE. The centralized scheduler server 254 searches all connected eNBs for the dominant interference without limitation to the coverage of a macro eNB.

The centralized scheduler server 254 sorts the dominant interferences of the individual UEs found at step 502 in a descending order of signal strength at step 504.

The centralized scheduler server 254 determines a compensation weight value to be applied to the formula for determining a number of interference cells to be requested for blanking at step 506.

The compensation weight value can be determined as follows:

Macro to Macro Compensation Weight=α
Macro to LeNB Compensation Weight=β
LeNB to Macro Compensation Weight=γ
LeNB to LeNB Compensation Weight=λ

Here, α is the compensation weight value to be applied when the serving cell of the UE i is a macro eNB and the eNB to be requested for blanking is another macro eNB. β is the compensation weight value applied when the serving cell of the UE i is a macro eNB and the eNB to be requested for blanking is a micro eNB. γ is the compensation weight value to be applied when the serving cell of the UE i is a micro eNB and the eNB to be requested for blanking is a macro eNB. λ is the compensation weight value to be applied when the serving cell of the UE i is a micro eNB and the eNB to be requested for blanking is another micro eNB.

The centralized scheduler server 254 adjusts the compensation weights α, β, γ, and λ to efficiently control the inter-cell interference in the coordinated cells.

The centralized scheduler server 254 determines a number of interference cells to be blanked per UE at step 508. The numeral of interference cells to be blanked per UE is determined according to the following Equation (3).

$$k^* = \arg\max_{k \in \{0,1,\ldots,INT_i\}} \frac{R_i(k)}{W_k} \quad (3)$$

In Equation (3), $INT_1$ denotes the number of dominant interferences. $R_i(k)$ denotes the rate when the number of interference cells to be requested for blanking is k. $W_k$ denotes the compensation weight factor determined according to the number of interference cells to be requested for blanking and is calculated in Equation (4) as follows.

$$W_{k+1} = W_k + \delta, \ W_0 = 1 \quad (4)$$

When the corresponding subframe is a normal subframe, $\delta$ in Equation (4) is set to a value of one of $\alpha$, $\beta$, $\gamma$, and $\lambda$. That is, if the serving cell of the UE i is a macro cell and the eNB to be requested for blanking is another macro eNB, $\delta$ is set to the value of $\alpha$. If the serving cell of the UE i is a macro eNB and the eNB to be requested for blanking is a micro eNB (LeNB), $\delta$ is set to the value of $\beta$.

If the serving cell of the UE i is a micro eNB and the eNB to be requested for blanking is a macro eNB, $\delta$ is set to the value of $\gamma$, and if the serving cell of the UE i is a micro eNB and the eNB to be requested for blanking is another micro eNB, $\delta$ is set to the value of $\lambda$.

If the corresponding subframe is a macro blanking subframe, all macro eNBs are blanked and thus $\delta$ is set to the value of $\lambda$.

The centralized scheduler server 254 determines the interference cell set to be requested for blanking per UE at step 510. In detail, the centralized scheduler server 254 determines the interference cell set to be requested for blanking per UE in such a manner of selecting as many eNBs as the number of blanking request interference cells per UE, which has been determined at step 508, in a descending signal strength order.

Returning to FIG. 4, the centralized scheduler server 254 selects scheduling candidate UEs per eNB at step 418. For example, the centralized scheduler server 254 is capable of selecting the UEs having maximum Proportional Fair (PF) metric value as scheduling candidate UEs. The PF metric formula can be modified by reflecting UE Quality of Service (QoS) and resource allocation ratio.

However, if the corresponding subframe is a normal subframe, the UEs served by the low power micro eNBs located at the range expansion area are disqualified from being the scheduling candidate. By disqualifying the LeNB UEs in the range expansion area that are exposed to the significant inter-cell interference from the high power macro eNBs from being the scheduling candidates, the outage probability of the LeNB UEs is reduced.

The centralized scheduler server 254 performs inter-cell interference coordination on the scheduling candidate UEs of all eNBs at step 420.

Figure 6:
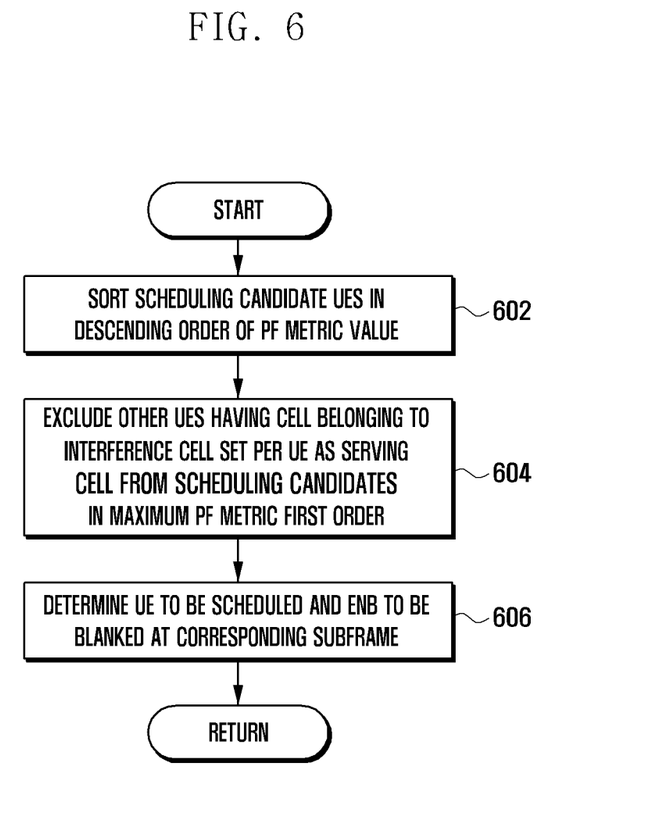
FIG. 6 illustrates the details of the inter-cell interference coordination step of FIG. 4.

FIG. 6 illustrates the details of the inter-cell interference coordination step 420 of FIG. 4.

The centralized scheduler 254 sorts the scheduling candidate UEs selected at step 418 in a descending order of PF metric value at step 602, based on Equation (5) as follows.

$$\text{PF Metric}[k] = R(k, n)/T\text{avg}(k, n) \quad (5)$$

In Equation (5), k denotes the candidate UE index, n denotes time, R denotes channel quality as transmission data rate when the current UE k is allocated the target resource, and Tavg denotes the average data rate allocated to the UE k. That is, the better the channel quality of the UE and the lower the allocated average data rate, the higher the PF metric value. Through this scheduling mechanism, the average throughput of the system is improved and scheduling fairness to the UEs is guaranteed. Step 602 is described in detail with reference to FIG. 7A.

Figure 7A:
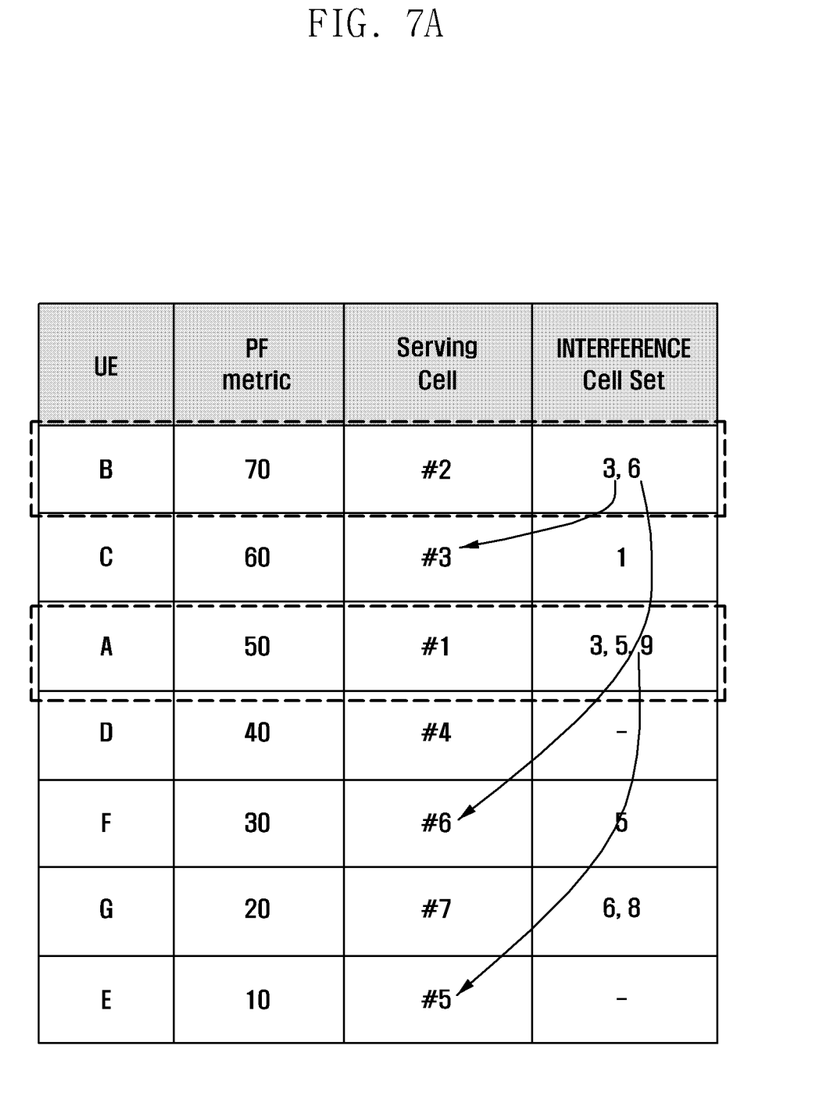
FIG. 7A illustrates an scheduling candidate UEs sorting process of FIG. 6.

As shown in FIG. 7A, the centralized scheduler server 254 sorts the UEs selected as scheduling candidates in a descending order of PF metric value and configures the serving cell and interference cell set of each UE.

Returning to FIG. 6, the centralized scheduler server 254 excludes the UEs having the blanking request interference cell set of the corresponding UE as service cell from the scheduling candidates in the maximum PF metric first order at step 604. Step 604 is described in detail with reference to FIG. 7B.

Figure 7B:
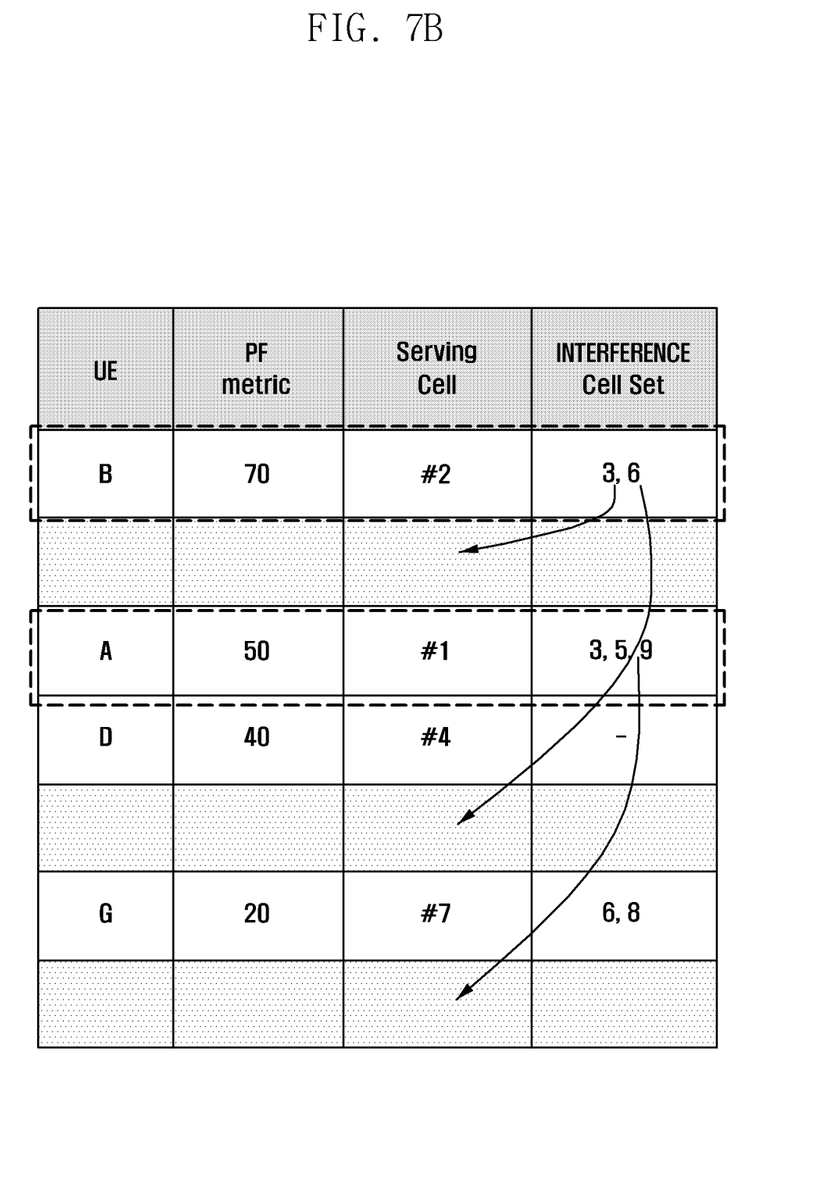
FIG. 7B illustrates an UE exclusion process of FIG. 6.

As shown in FIG. 7B, the centralized scheduler 254 excludes the UEs having any of the cells included in the interference cell set of the corresponding UE as the serving cell from the scheduling candidates in the maximum PF metric first order.

Returning to FIG. 6, when step 604 has been performed for all scheduling candidate UEs, step 606 is performed, in which the centralized scheduler 254 determines the UEs to be scheduled and the eNBs to be blanked in the corresponding subframe.

As described above, the centralized-scheduling method and apparatus of the present invention is capable of blanking (powering off) at least one macro or micro eNBs determined as dominant interference sources at every subframe, thereby stopping data transmission to the served UEs, and resulting in canceling the inter-cell interference.

The centralized-scheduling method and apparatus of the present invention is capable of minimizing the inter-cell interferences from the high power macro eNBs to LeNB UEs, from neighbor low power local eNBs to the LeNB UEs, from LeNBs to the macro UEs, and neighbor high power macro eNBs to the macro UEs, resulting in maximization of sum capacity of the HetNet.

The centralized-scheduling method and apparatus of the present invention introduces a centralized node to the legacy X2 interface-based CoMP so as to improve the inter-site (inter-eNB) CoMP performance, enabling the adoption of CoMP between eNB clusters, resulting in performance improvement in CoMP scenarios 3 and 4 under the HetNet environment.

Furthermore, the centralized-scheduling method and apparatus of the present invention is capable of connecting the centralized scheduler node and each eNB through a non-ideal backhaul such as Ethernet backhaul as well as optic backhaul, thereby improving the HetNet CoMP performance even when there is some delay on the backhaul between the centralized scheduler and each eNB.

Although embodiments of the present invention have been described in detail hereinabove with specific terminology, and the invention is limited thereto. While particular embodiments of the present invention have been illustrated and described, it would be obvious to those skilled in the art that various other changes and modifications can be made without departing from the spirit and scope of the invention.

What is claimed is:

1. An inter-cell interference control method of a server in a heterogeneous network, the method comprising:
   establishing a connection with at least one base station;
   collecting channel information between the at least one base station connected to the server and at least one terminal;
   determining interfering base stations causing interference to each terminal based on the channel information;

determining an interference base station set among the determined interfering base stations for stopping data transmission based on a number of an interference base station to be blanked and signal strength of the interfering base stations;

selecting the terminal to be scheduled based on the interference base station set;

expanding, when the at least one base station includes at least one of a micro base station and a macro base station, service coverage of the micro base station after establishing the connection; and performing, after collecting the channel information, a handover of the terminal having outage probability to the macro base station among the terminals located in the expanded service coverage of the micro base station.

2. The method of claim 1, wherein selecting the terminal to be scheduled comprises stopping data transmission from the interfering base stations to the terminal at a scheduling timing.

3. The method of claim 2, further comprising:
configuring, after expanding service coverage, a blank subframe period for suspending data transmission of the macro base station; and
stopping, after performing a handover, data transmission of the macro base station in the blank subframe period.

4. The method of claim 3, wherein selecting the terminal to be scheduled further comprises excluding the terminal in the expanded service coverage of the micro base station from scheduling terminal candidates in a normal subframe period.

5. The method of claim 4, further comprising selecting, after collecting the channel information, a serving cell by the terminal.

6. The method of claim 5, wherein determining the interfering base stations comprises:
searching for an interference signal to the terminal.

7. The method of claim 6, wherein the terminal to be scheduled is selected based on a Proportional Fair (PF) metric value.

8. The method of claim 2, wherein the at least one base station includes at least one micro base station.

9. The method of claim 6, wherein determining the interference base station set further comprises:
sorting the interfering base stations in a descending order of signal strength;
determining a number of elements of the interference base station set based on a compensation weight value; and
selecting a same number of the base stations as the number of elements among the sorted base stations.

10. The method of claim 7, wherein selecting the terminal to be scheduled comprises:
sorting the terminal to be scheduled in a descending PF metric value order; and
selecting the terminal to be scheduled by disqualifying the terminal having the base station included in the interference base station set from being selected as a serving base station.

11. An inter-cell interference canceling apparatus of a heterogeneous network, the apparatus comprising:
a transceiver configured to establish a connection with at least one base station; and
a controller configured to collect channel information between the at least one base station connected to the server and at least one terminal, determine interfering base stations causing interference to each terminal based on the channel information, determine an interference base station set among the determined interfering base stations for stopping data transmission based on a number of an interference base station to be blanked and signal strength of the interfering base stations, and select the terminal to be scheduled in consideration of the interfering base stations,
wherein the at least one base station comprises at least one of a micro base station and a macro base station, and the controller is further configured to expand service coverage of the micro base station after establishing the connection and perform, after collecting the channel information, a handover of the terminal having an outage probability to the macro base station among the terminals located in the expanded service coverage of the micro base station.

12. The apparatus of claim 11, wherein the controller is further configured to stop data transmission from the interference base station set to the terminal at a scheduling timing.

13. The apparatus of claim 12, wherein the controller is further configured to configure, after expanding service coverage, a blank subframe period for suspending data transmission of the macro base station and stop, after performing a handover, data transmission of the macro base station in the blank subframe period.

14. The apparatus of claim 13, wherein the controller is further configured to exclude the terminal in the expanded service coverage of the micro base station from scheduling terminal candidates in a normal subframe period.

15. The apparatus of claim 13, wherein the controller is further configured to search for an interference signal to the terminal.

16. The apparatus of claim 15, wherein the controller is further configured to select the terminal to be scheduled based on a Proportional Fair (PF) metric value.

17. The apparatus of claim 11, wherein the at least one base station includes at least one micro base station.

18. The apparatus of claim 15, wherein the controller is further configured to sort the interfering base stations in a descending order of signal strength, determine a number of elements of the set based on a compensation weight value, and choose as many of the base stations as the number of elements among the sorted base stations.

19. The apparatus of claim 16, wherein the controller is further configured to sort the terminal to be scheduled in a descending order of PF metric value and choose the terminal to be scheduled by disqualifying the terminal having the base station included in the interference base station set from being selected as a serving base station.

* * * * *